US005749640A

United States Patent [19]

Yu

[11] Patent Number: 5,749,640

[45] Date of Patent: May 12, 1998

[54] APPARATUS FOR PROJECTING MOVING AND CHANGING COLORED LIGHT RAYS ALONG A HORIZONTAL AXIS, THE LIGHT RAYS BEING ROTATABLE SYNCHRONOUSLY ABOUT THE HORIZONTAL AXIS

[75] Inventor: Jason Yu, Taipei, Taiwan

[73] Assignee: J.A.L. Taiwan Ltd., Chung Ho, Taiwan

[21] Appl. No.: 795,074

[22] Filed: Feb. 5, 1997

[51] Int. Cl.$^{6}$ .................................................... G03B 21/28

[52] U.S. Cl. ................................ 353/51; 353/50; 353/46

[58] Field of Search ................................ 353/46, 50, 51, 353/48, 49, 1; 359/616

[56] References Cited

U.S. PATENT DOCUMENTS

| | | | |
|---|---|---|---|
| 3,215,033 | 11/1965 | VanGelder et al. | 353/51 |
| 3,337,287 | 8/1967 | Lessman | 353/51 |
| 4,010,361 | 3/1977 | Latterman et al. | 353/1 |
| 5,253,000 | 10/1993 | Stoeckner | 353/46 |
| 5,526,076 | 6/1996 | Walker | 353/51 |

*Primary Examiner*—William Dowling
*Attorney, Agent, or Firm*—Sheridan Ross, P.C.

[57] ABSTRACT

A light emitting apparatus includes a first stepper motor, a mounting frame, a second stepper motor, at least one reflector, and a light source. The first stepper motor has a first rotor and a first output shaft coupled to and driven by the first rotor. The frame is fixed to and rotates together with the first output shaft. The second stepper motor has a second rotor and a second output shaft coupled to and driven by the second rotor. The second stepper motor is mounted on the mounting frame such that the second output shaft is transverse to the first output shaft and is rotatable relative to the mounting frame. The reflector is fixed to and rotates with the second output shaft, and has a light reflecting surface and a plurality of differently colored reflecting facets disposed around an axis of the second output shaft and on the reflecting surface. The light source is radially spaced from the first output shaft such that light emitted by the light source is reflected by the light reflecting surface of the reflector when the mounting frame is turned stepwise by the first output shaft so as to move the reflector on a route of the emitted light.

5 Claims, 5 Drawing Sheets

APPARATUS FOR PROJECTING MOVING AND CHANGING COLORED LIGHT RAYS ALONG A HORIZONTAL AXIS, THE LIGHT RAYS BEING ROTATABLE SYNCHRONOUSLY ABOUT THE HORIZONTAL AXIS

BACKGROUND OF THE INVENTION

1. Field of the Invention

The invention relates to a light emitting apparatus, more particularly to an apparatus for constantly projecting moving and changing colored light rays in order to create an enjoyable environment around the apparatus, thereby attracting attention and arousing the dancing mood of people near the apparatus.

2. Description of the Related Art

Referring to FIG. 1, a conventional light emitting apparatus 10 is shown to include a casing provided with a frontward magnifying lens 18, a driving unit 14 disposed in the casing and supported by a vertical stand 12, a spherical light reflector 16 mounted on a horizontally extending shaft 13 of the driving unit 14, and a light source 11 interposed between the reflector 16 and the lens 18. The reflector 16 has a concave surface 15 provided with a plurality of different colored transmission facets 17 such that differently colored rays are emitted to an exterior of the casing via the magnifying lens 18 when the driving unit 14 is actuated.

Because the reflector 16 rotates continuously about the horizontal shaft 13, the differently colored rays emitted therefrom will pass through the lens 18 so as to strike a wall and correspondingly rotate on the wall centering about a fixed position. This creates a dull environment and accordingly cannot arouse an impelling attractiveness to the audience.

SUMMARY OF THE INVENTION

It is the object of this invention to provide a light emitting apparatus that can project moving and changing colored rays in horizontal and vertical directions so as to attract the attention of the audience.

Accordingly, the apparatus for projecting a plurality of moving and changing colored light rays of this invention includes a first stepper motor, a mounting frame, a second stepper motor, at least one reflector, and a light source. The first stepper motor has a first rotor and a first output shaft coupled to and driven by the first rotor. The frame is fixed to and rotatable together with the first output shaft. The second stepper motor has a second rotor and a second output shaft coupled to and driven by the second rotor. The second stepper motor is further mounted on the mounting frame such that the second output shaft is transverse to the first output shaft and is rotatable relative to the mounting frame. The reflector is fixed to and rotates with the output shaft, and has a light reflecting surface and a plurality of differently colored reflecting facets disposed around an axis of the second output shaft and on the reflecting surface. The light source is radially spaced from the first output shaft such that light emitted by the light source is reflected by the light reflecting surface of the reflector when the mounting frame is turned stepwise by the first output shaft so as to move the reflector on a route of the emitted light.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
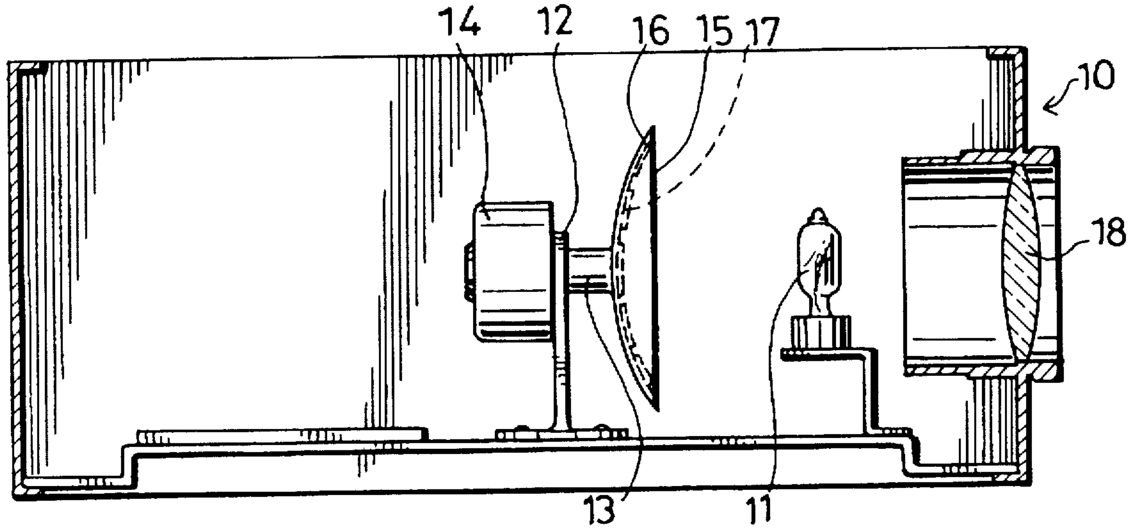
FIG.1 (PRIOR ART)
FIG. 1 is a conventional light emitting apparatus used generally in entertaining people.

Before the present invention is described in greater detail, it should be noted that same reference numerals have been used to denote like elements throughout the disclosure.

Figure 2:
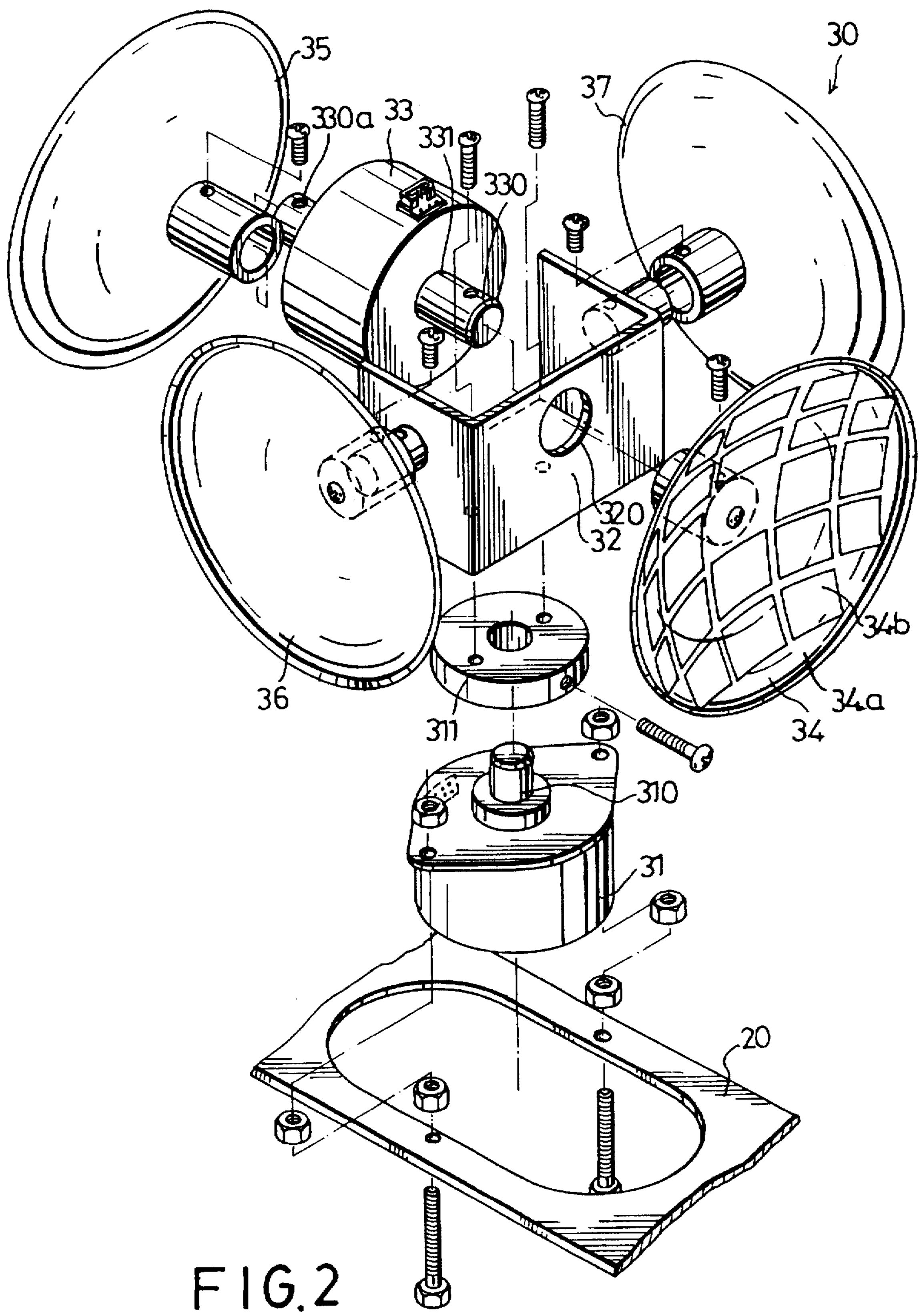
FIG. 2 is an exploded view of a light emitting apparatus according to this invention.
Figure 3:
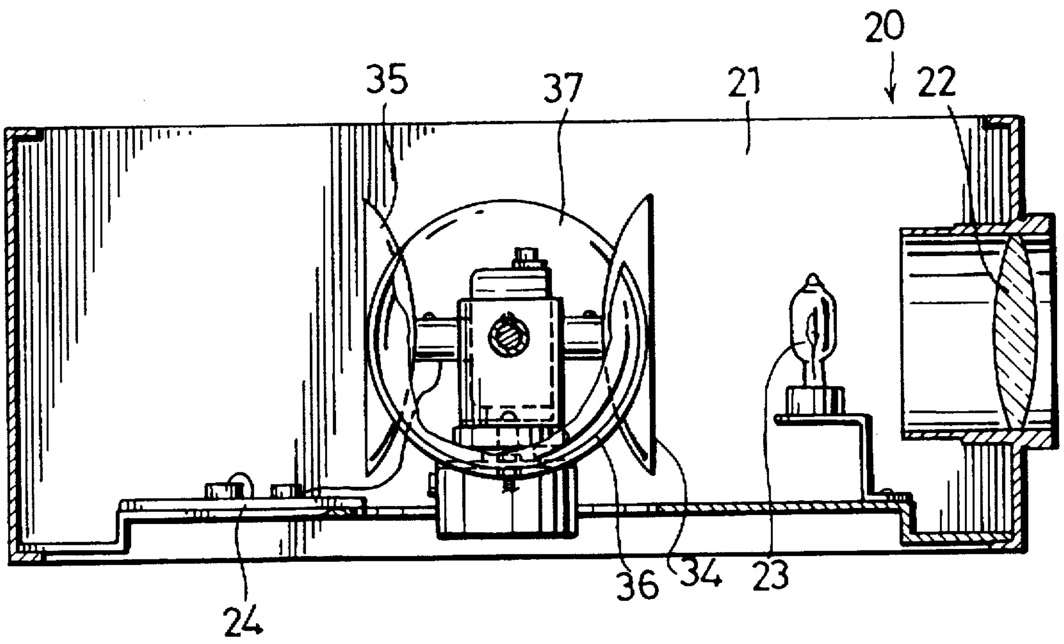
FIG. 3 is a partly sectional, schematic view of the light emitting apparatus of FIG. 2.

Referring to FIGS. 2 and 3, the light emitting apparatus 30 of this invention is capable of projecting a plurality of moving and changing colored light rays and is shown to include an enclosed casing 20, a first stepper motor 31, a generally U-shaped mounting frame 32, a second stepper motor 33, four reflectors 34, 35, 36, 37, and a light source 23.

As illustrated, the enclosed casing 20 is formed with a magnifying glass 22 through which the light emitted by the light source 23 can pass. The first stepper motor 31 is fixed on the mounting frame 32 by means of a positioning disc 311 and has a rotor housing for rotatably accommodating a first rotor and a first output shaft 310 coupled to the first rotor so as to be driven by the latter. Thus, the frame 32 rotates together with the first output shaft 310 when the first stepper motor 31 is actuated.

The second stepper motor 33 is mounted on the mounting frame 32 and has a second rotor and a second output shaft 331 coupled to and driven by the second rotor such that the second output shaft 331 is transverse to the first output shaft 310 of the first stepper motor 31. The second output shaft 331 extends through a through hole 320 in the mounting frame 32 and is rotatable relative to the latter when the second stepper motor 33 is actuated.

A first reflector 34 is fixed to the first end 330 of the second output shaft 331 and has a concave-shaped light reflecting surface 34a. The first reflector 34 is positioned at a focal point of the light source 23. A plurality of differently colored reflecting facets 34b are disposed on the reflecting surface 34a of the reflector 34 so as to be located around the axis of the second output shaft 331 of the second stepper motor 33.

The light source 23 is disposed in the enclosed casing 20 between the magnifying lens 22 and the first and second stepper motors 31, 33 so as to be radially spaced from the first output shaft 310 such that light emitted by the light source 23 is reflected by the light reflecting surface 34 of the first reflector 34 when the mounting frame 32 is turned stepwise by the first output shaft 310 so as to move the first reflector 34 on the route of the emitted light.

A second reflector 35 is fixed on the second end 330a of the second output shaft 331 and is located at an opposite side of the first reflector 34.

The third and fourth reflectors 36, 37 are mounted stationarily to the mounting frame 32 and are opposite to each other in angular positions of 90 degree and 270 degree relative to the first reflector 34, respectively. Note that the second, third and fourth reflectors 35, 36 and 37 have the same structure as that of the first reflector 34.

Figure 4:
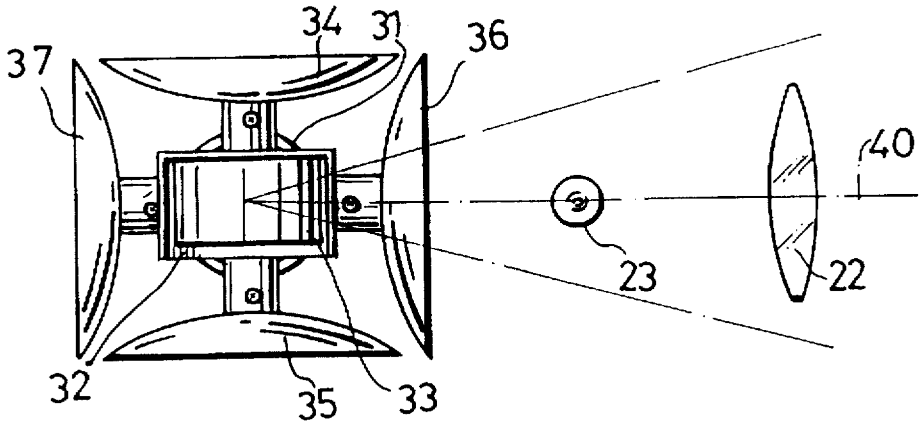
FIGS. 4 and 5 are top views of the light emitting apparatus of this invention, illustrating the apparatus in operation.
Figure 5:
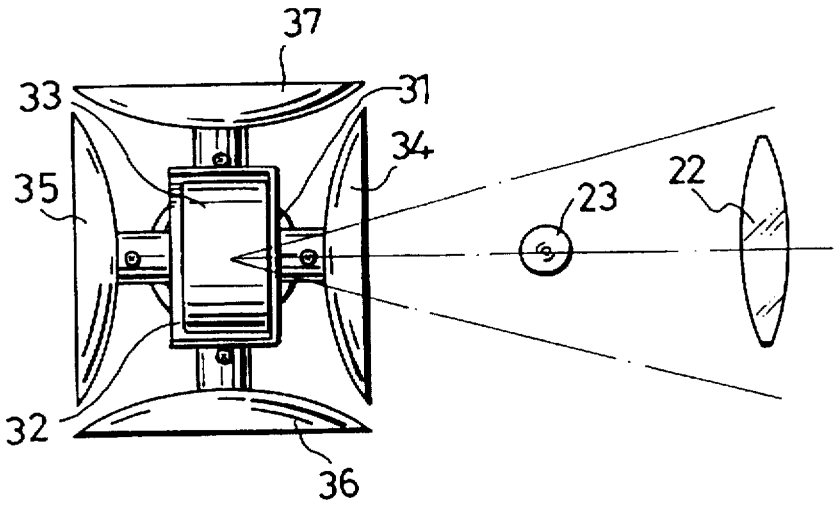

As illustrated in FIGS. 4 and 5, when the first and second stepper motors 31, 33 are simultaneously actuated, the reflectors 34, 35, 36 and 37 are driven to rotate about the first output shaft 310 (see FIG. 2) while the first and second reflectors 34, 35 synchronously rotate about the second output shaft 331 (see FIG. 2), wherein different colored rays will be projected from the reflectors 34, 35, 36 and 37 through the magnifying lens 22 so as to strike the adjacent walls to create different moving colored shades which rotate about a horizontal axis 40 and which simultaneously rotate about a vertical axis, thereby forming an enjoyable environment around the apparatus to attract attention and arousing the dancing mood of the people near the apparatus.

Figure 6:
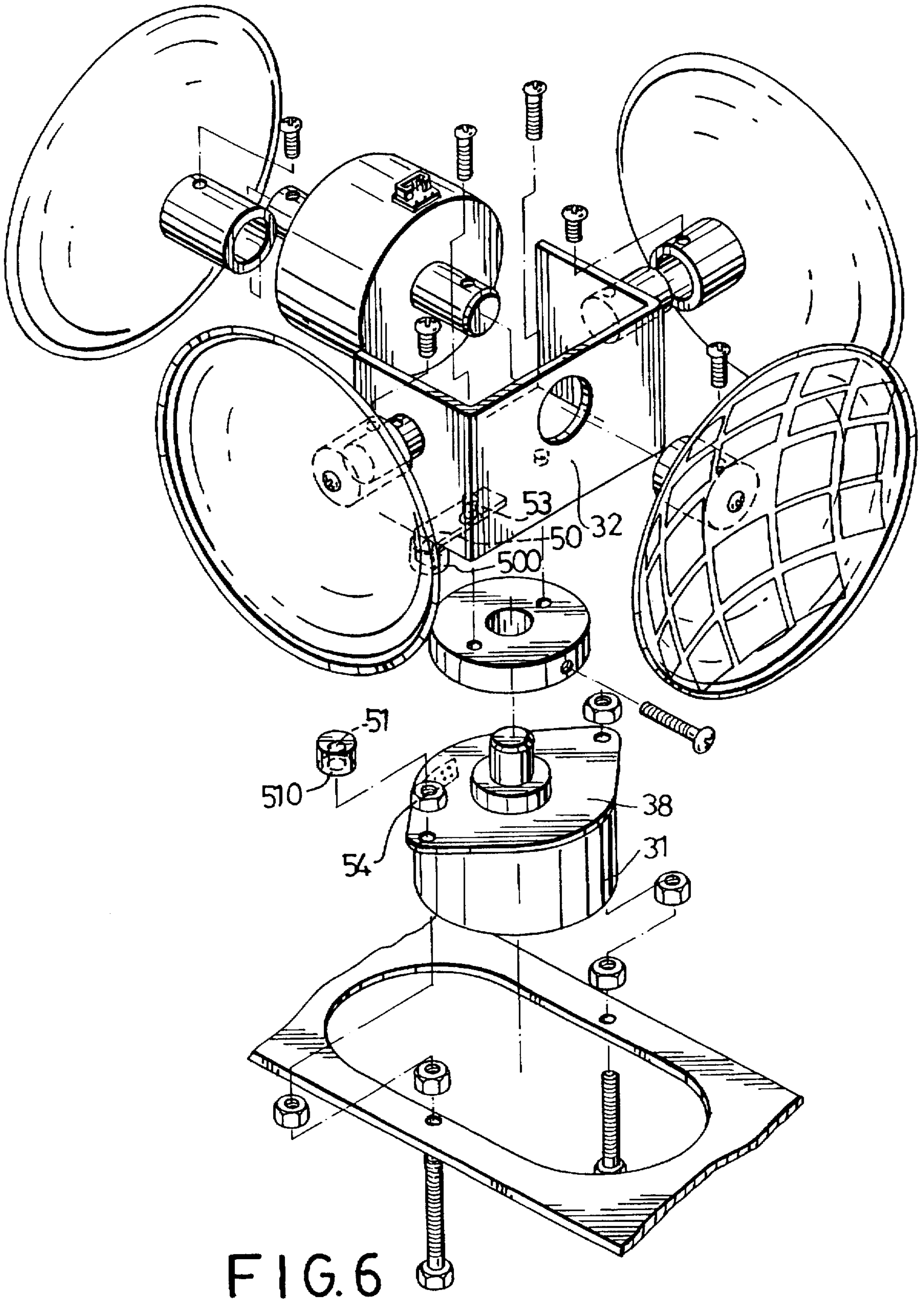
FIG. 6 is an exploded view of a modified embodiment of the light emitting apparatus of this invention.

As shown in FIG. 6, the apparatus of this invention can be further provided with a friction generating means which is disposed between the housing of the first stepper motor 31 and the mounting frame 32 and which is adapted to reduce oscillation of the first stepper motor 31 so as to assist in the resetting of the reflectors 34, 35, 36, 37 (see FIG. 2) back to their original positions. The friction means includes a positioning plate 53 fixed to the mounting frame 32, a first colliding tongue 50 mounted on the plate 53 and covered by a rubber sleeve 500, and a second colliding tongue 51 threadedly mounted in a nut seat 54 of a mounting plate 38 on the first stepper motor 31. The second colliding tongue 51 has a rubber sleeve 510 sleeved thereon.

With this invention thus explained, it is apparent that numerous modifications and variations can be made without departing from the scope and spirit of this invention. It is therefore intended that this invention be limited only as indicated in the appended claims.

I claim:

1. An apparatus for projecting a plurality of moving and changing colored light rays, comprising:

a first stepper motor having a first rotor and a first output shaft coupled to and driven by said first rotor;

a mounting frame fixed to and rotatable with said first output shaft;

a second stepper motor having a second rotor and a second output shaft coupled to and driven by said second rotor, said second stepper motor being mounted on said mounting frame such that said second output shaft is transverse to said first output shaft, and is rotatable relative to said mounting frame;

at least a first reflector fixed to and rotatable with said second output shaft, said first reflector having a light reflecting surface and a plurality of differently colored reflecting facets disposed around an axis of said second output shaft and on said reflecting surface; and a light source radially disposed and spaced from said first output shaft such that light emitted by said light source is reflected by said light reflecting surface of said first reflector when said mounting frame is turned stepwise by said first output shaft so as to move said first reflector on a route of the emitted light.

2. The apparatus according to claim 1, wherein said light reflecting surface is concave-shaped and said light source is positioned at a focal point thereof.

3. The apparatus according to claim 1, further comprising a second reflector fixed to and rotatable with said second output shaft, said second reflector being disposed at an opposite side of said first rotor relative to said first reflector.

4. The apparatus according to claim 1, further comprising a pair of reflectors mounted stationarily relative to said frame, said pair of reflectors being disposed opposite to each other and in angular positions of 90 degree and 270 degree relative to said first reflector, respectively.

5. The apparatus according to claim 1, wherein said first stepper motor includes a housing for rotatably accommodating said first rotor, said apparatus further comprising means for generating friction to reduce oscillation of said first stepper motor, said friction generating means being disposed between said housing of said first stepper motor and said mounting frame.

* * * * *